(12) United States Patent
Takahashi

(10) Patent No.: US 7,004,473 B2
(45) Date of Patent: Feb. 28, 2006

(54) MECHANICAL SEAL DEVICE

(75) Inventor: Hidekazu Takahashi, Sakado (JP)

(73) Assignee: Eagle Industry Co., Ltd., Tokyo (JP)

( * ) Notice: Subject to any disclaimer, the term of this patent is extended or adjusted under 35 U.S.C. 154(b) by 0 days.

(21) Appl. No.: 10/329,821

(22) Filed: Dec. 27, 2002

(65) Prior Publication Data
US 2003/0122313 A1 Jul. 3, 2003

(30) Foreign Application Priority Data
Dec. 28, 2001 (JP) .............................. 2001-398717

(51) Int. Cl.
F01D 11/02 (2006.01)
F16J 15/40 (2006.01)
(52) U.S. Cl. ...................... 277/348; 277/390; 277/408
(58) Field of Classification Search ................ 277/358, 277/367, 377, 370, 387–393, 379–380, 348, 277/408
See application file for complete search history.

(56) References Cited

U.S. PATENT DOCUMENTS

| 4,669,735 | A | * | 6/1987 | Sundberg et al. ........... 277/306 |
| 5,249,812 | A | * | 10/1993 | Volden et al. .............. 277/361 |
| 5,324,048 | A | * | 6/1994 | Carmody .................... 277/367 |
| 5,435,574 | A | * | 7/1995 | Victor et al. ................ 277/379 |
| 5,863,047 | A | * | 1/1999 | Ellis ........................... 277/374 |
| 6,293,555 | B1 | * | 9/2001 | Sedy ........................... 277/379 |
| 6,425,583 | B1 | * | 7/2002 | Muraki ....................... 277/358 |
| 6,517,078 | B1 | * | 2/2003 | Schruefer et al. .......... 277/398 |
| 6,601,854 | B1 | * | 8/2003 | Auber ......................... 277/377 |

* cited by examiner

Primary Examiner—Brian E. Glessner
Assistant Examiner—Christopher J. Boswell
(74) Attorney, Agent, or Firm—Arent Fox PLLC

(57) ABSTRACT

A primary object of the present invention is to achieve a high sealing performance, to collect hazardous gas contained in a sealed process fluid, and to realize an easy disposition of a mechanical seal device. A typical configuration is that the end face of a shaft sleeve engages a rotary shaft by a step shoulder of the shaft which is disposed in the sealed fluid side relative to the stationary seal ring, and that the inner diameter of the end face is set larger than the inner diameter of the sealed fluid pressure surface on the back face of the stationary seal ring. This construction makes it easy to dispose a mechanical seal device and with this mechanical seal device, the sealed process fluid is securely sealed.

6 Claims, 3 Drawing Sheets

MECHANICAL SEAL DEVICE

BACKGROUND OF THE INVENTION

1. Field of the Invention

The present invention relates generally to a mechanical seal device with an improved sealing ability and an easy installation of a shaft sleeve. More particularly, the invention relates to a mechanical seal device which retains a relative pressure difference in fluid pressure of a sealed fluid chamber, an intermediate chamber and a buffer fluid chamber to enhance its sealing ability.

2. Description of the Related Art

There has been a mechanical seal device as a relative art of the present invention, as shown in FIG. 3. FIG. 3 shows a half sectional view of the shaft seal device.

In FIG. 3, a shaft seal device 100 is disposed between the inner diameter surface of a housing 160 and the outer diameter surface of a rotary shaft 150. This shaft seal device is a tandemly configured mechanical seal device. This tandem type mechanical seal device comprises a contacting type mechanical seal device 101 in the region of sealed process fluid and a non-contact type mechanical seal device disposed in the atmospheric region.

In the contacting type mechanical face seal 101, a rotary seal ring 102 and a stationary seal ring 103 are disposed adjacent and opposite to each other. The rotary seal ring 102 and the stationary seal ring 103 make a sealing contact at respective sealing faces 104 and 105 wherein the rotary seal ring 102 is fixedly connected to one of split parts comprising a second shaft sleeve 141 and the mating stationary seal ring 103 is fixedly connected to a second seal cover 131. The sealing faces 104, 105 are elastically pressed against each other by springs 107 which are disposed on the back face 106 of the stationary seal ring 103. In addition, the pressure exerted on the back face 106 by the sealed process fluid pushes the sealing face 104 against the sealing face 105. An O-ring 108 is disposed on the inside diameter surface of the stationary seal ring 103 which determines the pressure area of the back face 106.

In the non-contact type mechanical seal device 110, a second rotary seal ring 111 and a second stationary seal ring 115 make a sealing contact at a second sealing face with spiral grooves 113 and a second sealing face 112, respectively. Contact between the second sealing face with spiral grooves 113 and the second sealing face 112 is further reinforced by a spring 116 and the pressure of purge gas exerted on a back face 117 of the stationary seal ring 115. The pressure area of the back face 117 is determined by an O-ring 119 which is disposed in the inner annular groove of the back face 117. The second stationary seal ring 115 is axially movable relative to a first seal cover 132 so that the second sealing face 112 is sufficiently biased by the spring 116 against the second sealing face with spiral grooves 113.

The rotary seal ring 111 fits over a first shaft sleeve 140 and is retained between a third shaft sleeve 142 and the mating part of the split parts of the second sleeve 141.

The flange of the first sleeve 140 engages a step of a rotary shaft 150. The first sleeve 140 fixates the second sleeve 141 and the second rotary seal ring by means of the third sleeve 142. Furthermore, a lock nut 143 engages a screw thread 144 prepared on the rotary shaft 150 so as to prevent the first sleeve 140 and the third sleeve 142 from moving in an axial direction. These three sleeves, 140, 141, 142, are separated parts and five O-rings 146 are installed for the sake of sealing A seal cover fixedly connected to the housing 160 is comprised of a first seal cover 131 and a second seal cover 132. The seal covers 131 and 132 are fixedly held between a step of the housing 160 and a presser cover 133. The seal covers 131 and 132 have a passage 121 to feed a purge gas into an intermediate chamber C'. Pressure of the purge gas is set lower than the pressure of the sealed process fluid.

The shaft seal device 100 constructed accordingly has to be able to retain the primary seal ring 102 and the secondary seal ring 111 so that they are free to rotate. Therefore, it is not only that the first, the second, and the third sleeves 140, 141, 142 become large in size, but that they have to be separable. Being separable parts then necessitates as many as five O-rings 146. This in turn yields a mass increase of the first, the second and the third sleeves, which requires a large diameter of the rotary shaft 150 to assure a high speed rotating motion. In addition, the tandem configuration of the mechanical seal device leads to a large axial length.

Since the pressure of the intermediate chamber C' is lower than the pressure of the sealed process fluid, there may be a leakage of the sealed process fluid into the intermediate chamber. Also the mechanical seal device 110 residing in the atmospheric region is a non-contact type, therefore the purge gas may leak to the atmospheric region. Accordingly, there remain problems in the seal performance of the shaft seal device 100.

The present invention is introduced to resolve the above mentioned problems. A primary technical goal which this invention tries to achieve is to collect the sealed process fluid with no leakage to the atmospheric region by enhancing the seal performance of the seal parts against the atmosphere region.

Another goal is to collect all the leaking fluid into the intermediate chamber without further leaking to the atmospheric region by means of the pressure of the intermediate chamber not only being set lower than the pressure of the sealed fluid but also being set lower than the pressure of the buffer fluid chamber.

Yet another goal is to fixate sleeves without use of fitting devices, to reduce the weight of the sleeves and their fitting devices, to achieve a high-speed rotating motion of the rotary shaft, and to reduce a production cost by decreasing the number of parts as the result of a weight reduction of the sleeves.

SUMMARY OF THE INVENTION

A primary object of the present invention is to resolve the above mentioned technical problems, and a solution to such problems is embodied as follows.

A preferred embodiment of a shaft seal device constructed in accordance with the principles of the present invention is a mechanical seal device with a sealed process fluid being sealed between the inner surface of a housing and a rotary shaft retained within the housing, the shaft seal device comprising a stationary seal ring and a rotary seal ring, the stationary seal ring sealingly fixed to the housing being axially biased by a spring and having a primary sealing face on one end whose other back face being pressurized by the sealed process fluid, the rotary seal ring fixedly connected to a sleeve being disposed in the sealed process fluid side relative to the stationary seal ring and having a secondary sealing face adjacent the primary sealing face, an end face of the sleeve engaging a shoulder of the rotary shaft which is disposed in the sealed process fluid side relative to the stationary seal ring, the end face having an inner surface diameter which is larger than the inner diameter of the back face of the stationary seal ring pressurized by the sealed process fluid.

In a shaft seal device as an embodiment of the present invention, the sealed process fluid exerts a larger force to the back face of the stationary seal ring than to the end face of the sleeve, therefore enabling the sleeve to engage the shoulder of the rotary shaft. Accordingly, the sleeve does not require a fitting device for fixing and thinning the wall thickness of the sleeve results in a reduction in weight. As a consequence, omitting fitting devices and thinning the sleeve yields a reduction in the total size of the mechanical seal device. The reduction in weight then makes it easy for the mechanical seal device to undergo a high speed rotating motion.

DETAILED DESCRIPTION OF THE INVENTION

Described below is details of the figures of a preferred embodiment of a shaft seal device constructed in accordance with the principles of the present invention. All the figures explained below are constructed according to actual design drawings with accurate dimensional relations.

Figure 1:
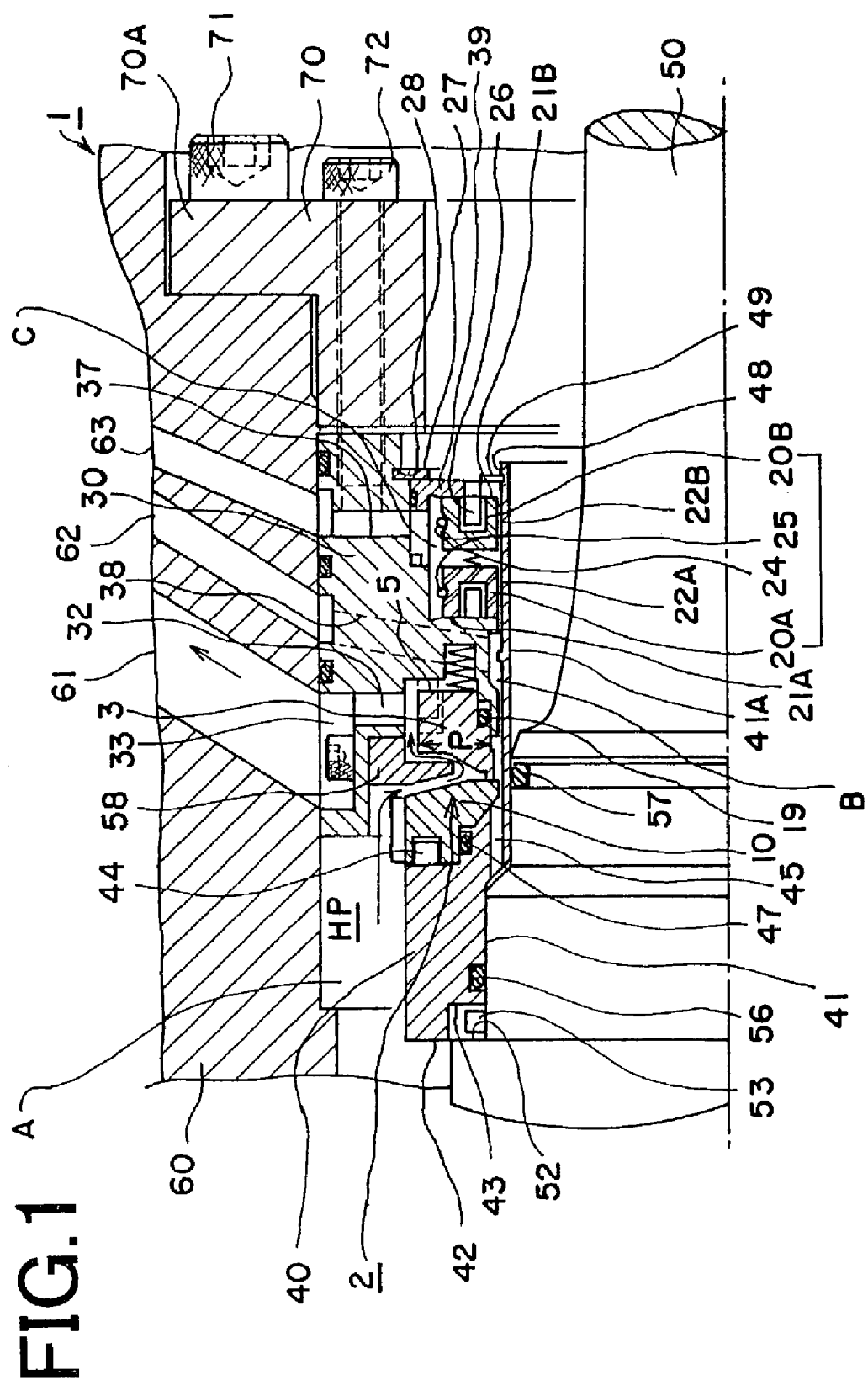
FIG. 1 is a half cut-away sectional view showing one preferred embodiment of a mechanical seal device of the present invention.
Figure 2:
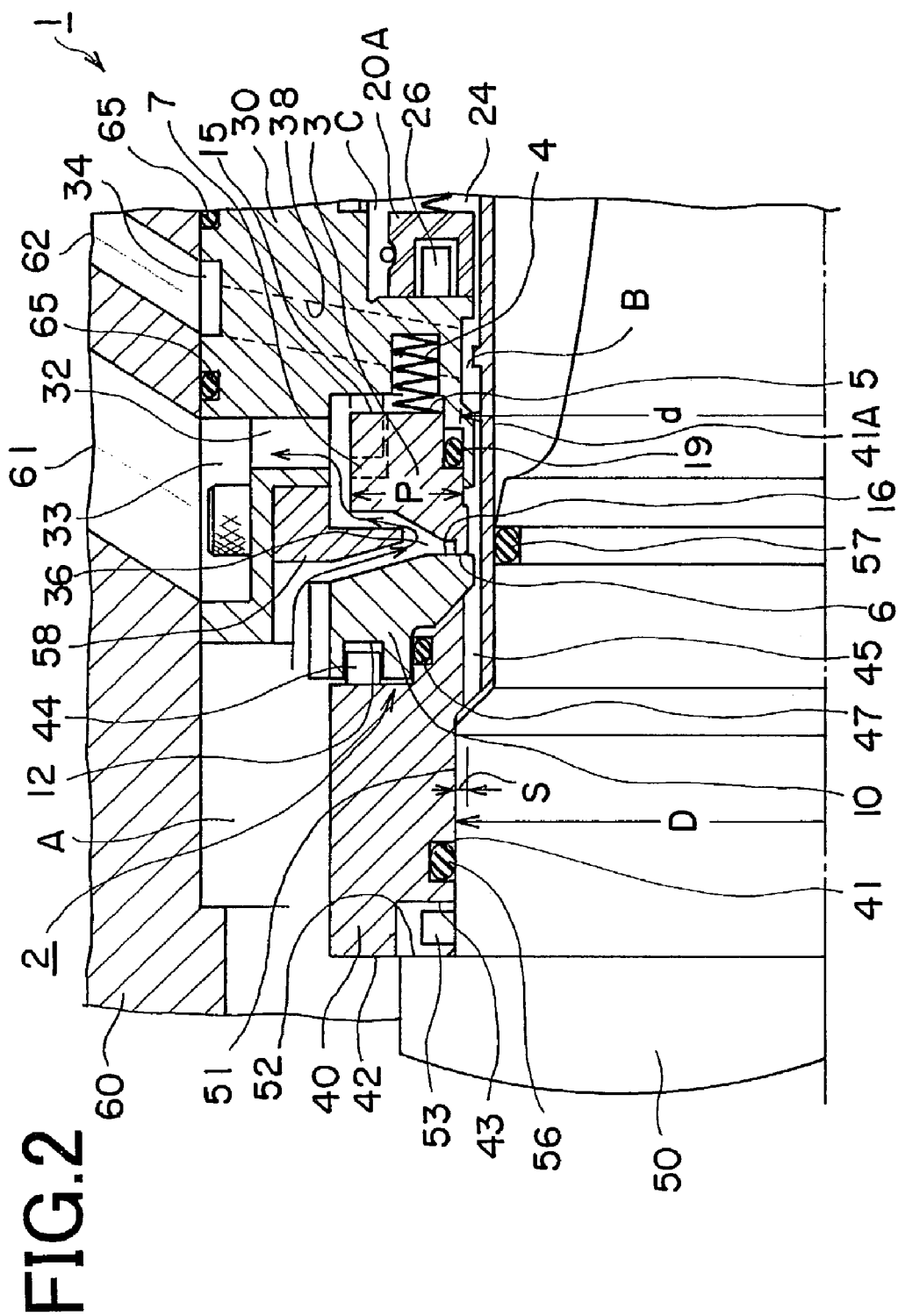
FIG. 2 is an enlarged sectional view of a portion of the mechanical seal device shown in FIG. 1.
Figure 3:
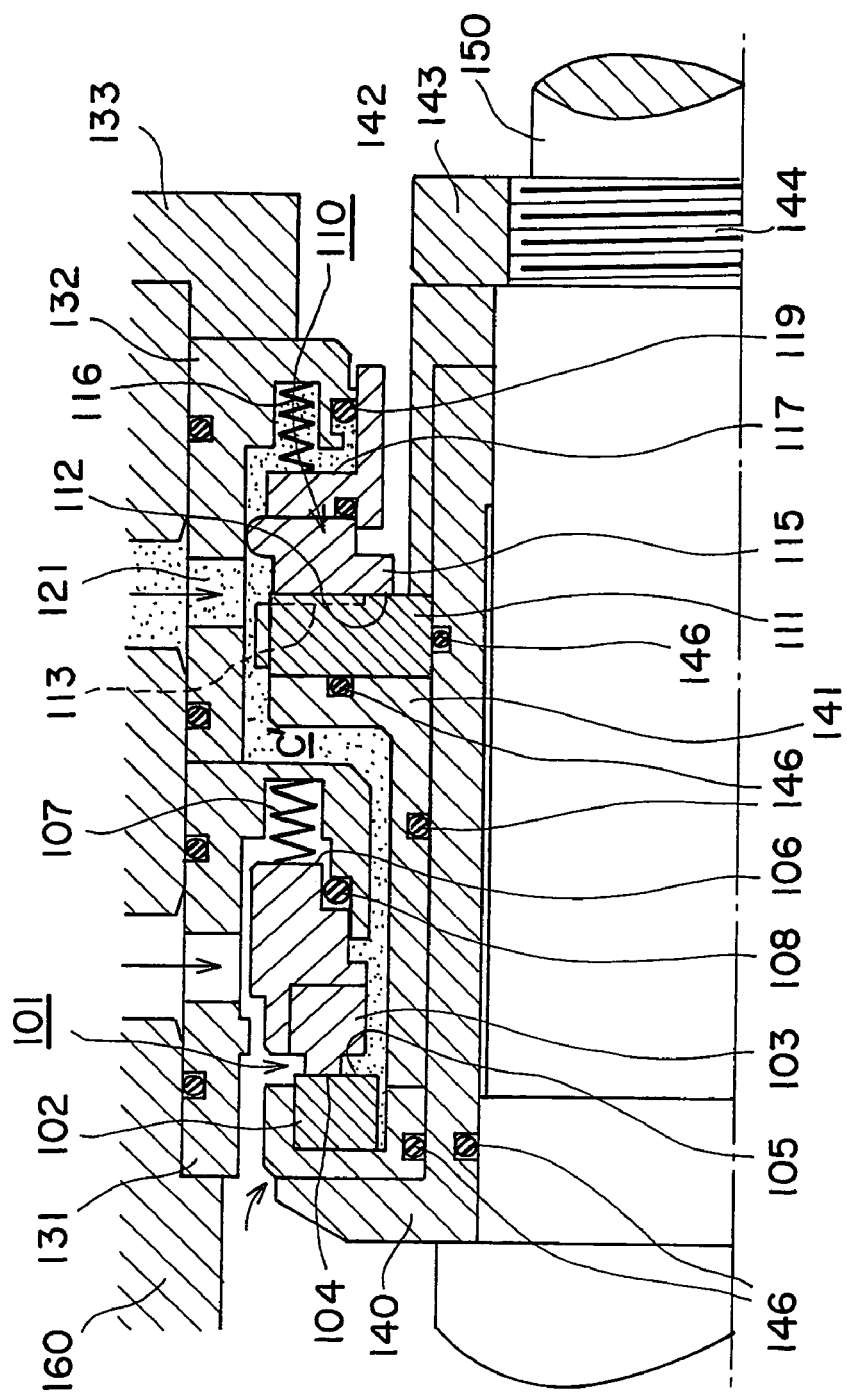
FIG. 3 is a half cut-away sectional view of a mechanical seal device according to the present invention.

FIG. 1 shows a half cross sectional view of a mechanical seal device in accordance with the present invention. FIG. 2 is a cross sectional view enlarging a sealed fluid region HP of FIG. 1.

In FIG. 1 and FIG. 2, a mechanical seal device 1 is disposed between the inner surface of a housing 60 and a rotary shaft 50. The mechanical seal device 1 mainly comprises a stationary seal ring 3 and a rotary seal ring 10.

The stationary seal ring 3 is retained in an annular groove of a seal cover 30 so as to move freely in an axial direction. In the back face 5 of the stationary seal ring 3, multiple biasing springs are disposed concentrically and equally spaced apart. A primary O-ring 19 made of rubber is disposed between a circumferential surface of the annular groove and an inner diameter surface of the stationary seal ring 3. By use of the primary O-ring 19, the sealed process fluid exerts pressure upon a surface radially extending from the inner diameter of the primary O-ring 19 to the outer diameter surface of the stationary seal ring 3. The pressure area of the surface becomes equal to the area of a back face upon which the sealed process fluid and the biasing spring 4 exert pressure to thrust forward the stationary seal ring 3.

This stationary seal ring 3 is retained such that a cavity 7 and a primary lock pin 15 inserted into the cavity 7 prevents the ring 3 from rotating, and a sealing face 6 resides on a front surface of the stationary seal ring 3 opposite to the back face 5.

In a rotary seal ring 10 disposed against the stationary seal ring 3, a sealing face 16 is disposed in such a way that the face 16 forms a sealing contact with the sealing face 6. The rotary seal ring 10 fitted over the rotary shaft 50 is constructed so as to rotate with the shaft 50 by means of an anti-rotation mechanism in which a protruding drive pin 44 is inserted to a lock bore 12. A secondary O-ring 47 is disposed between the two fit surfaces of the rotary seal ring 10 and the shaft sleeve 40 so as to achieve a sealing contact between the rotary seal ring 10 and the shaft sleeve 40.

The rotary shaft 50 has a shoulder 52 in the sealed fluid region HP. A secondary lock pin 53 is fixedly connected adjacent the shoulder 52 of the rotary shaft 50. A diameter surface in which the secondary lock pin 53 is fixed forms a fit surface 51. The rotary shaft 50 is made smaller in diameter in an atmospheric region LP.

The shaft sleeve 40 fitted over the rotary shaft 50 is made large in wall thickness in the sealed fluid region HP, and an end face 42 of the sleeve 40 is formed at the interface where the sleeve engages the shoulder 52 of the rotary shaft 50.

Inside the neighborhood of the end face 42 of the shaft sleeve 40 is formed a primary inner diameter surface 41 fitted over the fit surface 51. A third O-ring 56 is disposed between the fit surface 51 and the primary inner diameter surface 41. The third O-ring 56 provides a sealing between the fit surface 51 and the primary inner diameter surface 41. Furthermore, a tapered shoulder is disposed inside the sleeve 40 between the primary inside diameter surface 41 and a secondary inner diameter surface 41A, and an auxiliary through passage 45 is formed in the tapered shoulder. A fourth O-ring 57 is disposed in the atmospheric side LP of the tapered shoulder between the shaft sleeve 40 and the rotary shaft 50. In case of a leakage of the sealed process fluid from the third O-ring 56, the fourth O-ring 57 hinders further leakage such that the leaked fluid is guided to flow into an intermediate chamber B via the auxiliary through passage 45.

A symmetrically opposite pair of a first seal part 20A and a second seal part 20B are disposed inside a buffer fluid chamber C which resides inside the seal cover 30 fixed to the housing 60 as well as toward the atmospheric side of the cover 30. The first seal part 20A and the second seal part 20B are segment seals. In addition, multiple biasing springs are disposed concentrically and equally spaced apart between the first seal part 20A and the second seal 20B. The springs 24 impinge upon the first seal 20A and the second seal part 20B in axially opposite directions so that a first sealing face 21A of the first seal part 20A makes a sealing contact with the mating face of the seal cover 30 while a second sealing face 21B of the second seal part 20B makes a sealing contact with the mating seal cover face of a segmented seal cover 39.

Garter springs 24 and 25 engage outside diameter surfaces of the first seal part 20A and the second seal part 20B, respectively, and the first seal part 20A and the second seal part 20B being comprised of concentrically and equally spaced segments are fastened radially inward against the rotary shaft 50. The first seal part 20A and the second seal part 20B form a good seal with the rotary shaft 50 by an inner diameter sealing face 22A of the first seal part 20A and an inner diameter sealing face 22B of the second seal part 20B, respectively. The first seal 20A and the second seal 20B are retained by respective lock pins 26 fixedly connected to the seal cover 30. The buffer fluid chamber C is enclosed by the first seal part 20A and the second seal part 20B accordingly.

Segmented seal cover 39 fitted over the seal cover 30 in the atmospheric region LP is retained within the seal cover 30 by means of a snap ring 27. The snap ring 27 engages an annular groove disposed in the seal cover 30. A locating snap ring 49 disposed in the atmospheric side LP of the shaft sleeve 40 engages an annular groove 48 of the shaft sleeve 40 in a disconnectable manner. The snap ring 49 is disposed in such a way that not only the mechanical shaft seal 2 but also the first seal part 20A and the second seal part 20B are retained together between the seal cover 30 and the shaft sleeve 40. Therefore, the snap ring 49 can be removed from the sleeve 40 after the completion of assembly.

Once the mechanical seal device 1 is installed in a hydraulic machine, even after the snap ring 49 is removed from the shaft sleeve 40, the pressure of the sealed process fluid firmly thrusts the sleeve 40 against the shoulder 52 of the rotary shaft 50 because the pressure area of the back face 5 of the stationary seal ring 3 is larger than the pressure area of the end face 42 of the shaft sleeve 40. The press contact state is explained by the fact that an inner diameter D of the primary inside diameter surface 41 of the shaft sleeve 40 is set larger than an inner diameter d of the back face 5 of the stationary seal ring 3, and that a pressure exerted to the portion of the back face 5 in accordance with the diameter difference D-d causes the shaft sleeve 40 to be pressed against the shoulder 52 of the rotary shaft 50.

The seal cover 30 engages the housing 60 and is retained within the housing 60 by fixedly connecting a flange 70A of a retainer ring 70 to the housing 60 by means of screw bolts 71. Disposition of the seal cover 30 can be achieved by holding the right side end face of the cover 30 by the retainer ring 70 as seen in the figure, and does not require the left side end face of the cover 30 to be engaged by a step shoulder. This relation holds from the aforementioned relationship of counter pressures one of which is the pressure exerted to the back face 5 of the stationary seal ring 3 and the other of which is the pressure exerted onto the end face 42.

Intermediate chamber B is disposed between a pair of the seal parts 20A and 20B and the mechanical shaft seal 2 for the inner diameter surface of the seal cover 30 which fits over the housing 60. A drain passage 38 disposed in the seal cover 30 is a through hole connected to the intermediate chamber B. The drain passage 38 is directly connected to a drain hollow 62 via an annular cavity 34. A device to process hazardous gases such as ethylene gas or propylene gas is disposed at the outlet of the drain hollow 62. Pressure of the intermediate chamber B is set lower than that of a sealed fluid chamber A.

Furthermore, a circulation passage 32 is disposed in the seal cover 30 so as to cool off the mechanical shaft seal 2 by circulating the fluid such as oil from the sealed fluid chamber A. The circulation passage 32 is directly connected to a passage hollow 61 via an annular cavity 33. A dam 58 is disposed in the outer circumferential region of the mechanical shaft seal 2 to circulate along the sealing face 6 of the mechanical shaft seal 2 and the mating sealing face 16. The seal cover 30 and the retainer ring 70 are connected by screw bolts 72.

Buffer fluid passage 37 disposed in the seal cover 30 directly connects the buffer fluid chamber C and a buffer fluid hollow 63 via an annular cavity. Pressure of the buffer fluid chamber C is set higher than that of the intermediate chamber B.

As a consequence, a relation of the internal pressures of the sealed fluid chamber A, the intermediate chamber B, and the buffer fluid chamber C is represented by A>B and C>B. Therefore, the sealed process fluid is ejected from the drain passage 38 without leaking through the first seal part 20A and the second seal part 20B disposed in the buffer fluid chamber C. Fluid leaked from the sealed fluid chamber A also is ejected from the drain passage 38.

Next described is another form of a preferred embodiment in accordance with the present invention.

A mechanical seal device 1 as a second preferred embodiment of the present invention is to seal a sealed process fluid by being disposed between the inner circumferential surface of a housing 60 and a rotary shaft 50 retained inside the inner circumferential surface of the housing, being comprised of a mechanical shaft seal 2, a buffer fluid chamber C, seal parts 20A, 20B, and an intermediate chamber B, the mechanical shaft seal 2 being disposed between the housing 60 and a shaft sleeve 40 fitted over the rotary shaft 50 so as to seal the sealed process fluid, the buffer fluid chamber C being constructed between the housing 60 and the shaft sleeve 40 in the opposite side of the sealed fluid region with respect to the mechanical shaft seal 2 and being connected to a buffer fluid passage 37, the seal parts 20A, 20B to seal a gap between the shaft sleeve 40 and the housing 60 inside the buffer fluid chamber C, the intermediate chamber B being disposed between the mechanical shaft seal 2 and the seal parts 20A, 20B and being connected to a drain passage 38, the buffer fluid pressure inside the buffer fluid chamber C being set higher than the fluid pressure inside the intermediate chamber B.

The mechanical seal device 1 as the second preferred embodiment of the present invention can prevent a sealed process fluid inside the intermediate chamber B from leaking to an atmospheric region because of the pressure inside the buffer fluid chamber C being set higher than the pressure of the intermediate chamber B.

A mechanical seal device 1 as a third preferred embodiment of the present invention is constructed in such a way that the pressure of a sealed process fluid is lower than the fluid pressure in an intermediate chamber B while the pressure in an intermediate chamber B being higher than the fluid pressure in a buffer fluid chamber C.

In the mechanical seal device 1 as the third preferred embodiment of the present invention, even if the seal of the mechanical shaft seal 2 is broken, a harmful sealed process fluid is effectively prevented from leaking to an atmospheric region by being ejected from the intermediate chamber B to a collecting device through a drain passage 38 because of the pressure inside the intermediate chamber B being set lower than the pressure of the sealed fluid chamber A.

A mechanical seal device 1 as a fourth preferred embodiment of the present invention has a disconnectable snap ring disposed near the end face of a shaft sleeve to engage a split seal cover for retaining seal parts and the snap ring is removed after the mechanical seal device is installed to the shaft sleeve.

In the mechanical seal device 1 as the fourth preferred embodiment of the present invention, the shaft sleeve does not require fitting devices for retaining respective seal parts, therefore the sleeve 40 can be made light and slim. Furthermore, a rotary shaft and the sleeve do not need to fit over each other in an atmospheric region, therefore the rotary shaft can be made small in diameter. Consequently, the reduction in weight makes it possible for the rotary shaft to rotate fast. Also energy consumption can be saved for driving the rotary shaft.

Mechanical seal devices in accordance with the present invention are expected to be able to effective in the following merits.

In a mechanical seal device 1 in accordance with the present invention, a sealed process fluid exerts more pressure to the back face of a stationary seal ring 3 than to the end face 42 of a shaft sleeve 40, therefore the sleeve 40 can be engaged to a shoulder 52 of a rotary shaft 50. Accordingly, the sleeve 40 does not require a fitting device for fixing and thinning the wall thickness of the sleeve results in a reduction in weight. As a consequence, omitting fitting devices and thinning the sleeve 40 yields a reduction in the total size of the mechanical seal device. The reduction in weight then makes it easy for the mechanical seal device 1 to undergo a high speed rotating motion In addition, leakage of the sealed process fluid from the intermediate chamber B to the atmospheric region can be prevented due to the fact that the pressure inside the buffer fluid chamber C is set higher than the pressure of the intermediate chamber B.

Even in the case of a seal failure of the mechanical shaft seal 2, since the pressure of the intermediate chamber B is lower than the pressure of the sealed fluid chamber A, the leaked hazardous fluid is effectively caught and ejected from the intermediate chamber B to a collection device through the drain passage 38 without leaking to the atmospheric region HP Having described specific embodiments of the invention, however, the descriptions of these embodiments do not cover the whole scope of the present invention nor do they limit the invention to the aspects disclosed herein, and therefore it is apparent that various changes or modifications may be made from these embodiments.

The technical scope of the invention is specified by the claims.

What is claimed is:

1. A mechanical seal device for sealing between a housing containing a process fluid under pressure and a rotary shaft in said housing, the mechanical seal device comprising:

a stationary seal ring and a rotary seal ring, said stationary seal ring being sealingly attached to said housing, the stationary seal ring being elastically biased in an axial direction of said rotary shaft, the stationary seal ring having a sealing face at one end and a pressure surface operated by said process fluid at a back face, said back face being disposed at the opposite side of said end, said rotary seal ring being fixed to a shaft sleeve, the rotary seal ring being disposed on the atmospheric region side relative to said stationary seal ring, the rotary seal ring having a oppositely disposed mating sealing face relative to said sealing face, an end face of said shaft sleeve engaging a shoulder of said rotary shaft, said shoulder being disposed on the process fluid region side relative to said stationary seal ring, a passage being defined around the stationary seal ring, wherein a pressure of the sealed process fluid acts on the end face of the shaft sleeve and the pressure surface of the back face of the stationary seal ring, and an inner diameter of said end face being larger than an inner diameter of the pressure surface of said back face, wherein a surface area of the end face of the shaft sleeve on which a pressure of the sealed process fluid acts is smaller than a surface area of the pressure surface of the back face of the stationary seal ring on which the pressure of the sealed process fluid acts, and wherein the sealed process fluid exerts a larger force on the back face of the stationary seal ring than on the end face of the shaft sleeve.

2. A mechanical seal device as claimed in claim 1 wherein said shaft seal device has a disconnectable snap ring near the opposite end face of said shaft sleeve with respect to the direction of insertion, said snap ring being removed after the completion of installation of said mechanical seal device over said shaft sleeve.

3. A mechanical seal device as claimed in claim 1, wherein an area of said end face of the shaft sleeve on which a pressure of the sealed process fluid acts is smaller than an area of the pressure surface of said back face of the stationary seal ring on which the pressure of the sealed process fluid acts.

4. A mechanical seal device for sealing between a housing containing a process fluid under pressure and a rotary shaft in said housing, said mechanical seal device comprising:

a mechanical shaft seal being disposed between said housing and a shaft sleeve fitted over said rotary shaft and sealing said sealed process fluid therebetween;

a buffer fluid chamber being disposed between said shaft sleeve and said housing in the opposite side of the sealed fluid region with respect to said mechanical shaft seal, the buffer fluid chamber being directly connected to a buffer fluid passage;

a seal part sealing a gap between said shaft sleeve and said housing within said buffer fluid chamber;

an intermediate chamber being disposed between said mechanical shaft seal and said seal part, the intermediate chamber being directly connected to a drain passage; and the buffer fluid pressure within said buffer fluid chamber being set higher than the fluid pressure within said intermediate chamber, wherein the shaft sleeve, the mechanical shaft seal, the intermediate chamber and the seal part within the buffer fluid chamber are disposed adjacent each other in an axial direction of the rotary shaft.

5. A mechanical seal device as claimed in claim 4 wherein the fluid pressure of said intermediate chamber is set lower than the fluid pressure of the sealed process fluid.

6. A mechanical seal device as claimed in claim 4, wherein the mechanical shaft seal comprising:

a stationary seal ring and a rotary seal ring, said stationary seal ring being sealingly attached to said housing, the stationary seal ring being elastically biased in an axial direction of said rotary shaft, the stationary seal ring having a sealing face at one end and a pressure surface operated by said process fluid at a back face, said back face being disposed at the opposite side of said end, said rotary seal ring being fixed to a shaft sleeve, the rotary seal ring being disposed on the atmospheric region side relative to said stationary seal ring, the rotary seal ring having a oppositely disposed mating sealing face relative to said sealing face, an end face of said shaft sleeve engaging a shoulder of said rotary shaft, said shoulder being disposed on the process fluid region side relative to said stationary seal ring, a passage being formed around the stationary seal ring in order that a pressure of the sealed process fluid acts on not only the end face of the shaft sleeve but also the pressure surface of the back face of the stationary seal ring, an inner diameter of said end face being larger than an inner diameter of the pressure surface of said back face.

* * * * *